Figure 1:
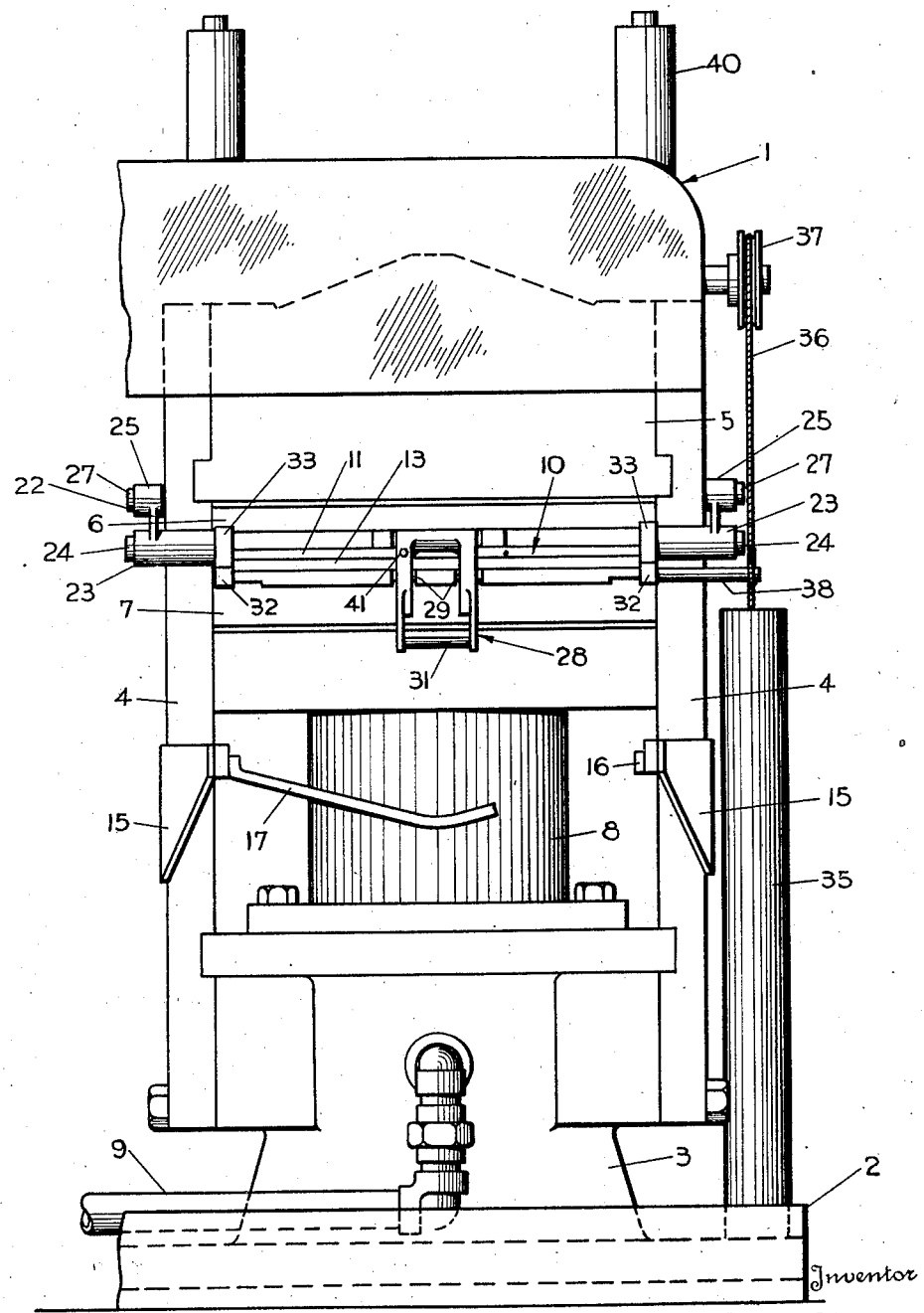

Inventor
Karl B. Kilborn

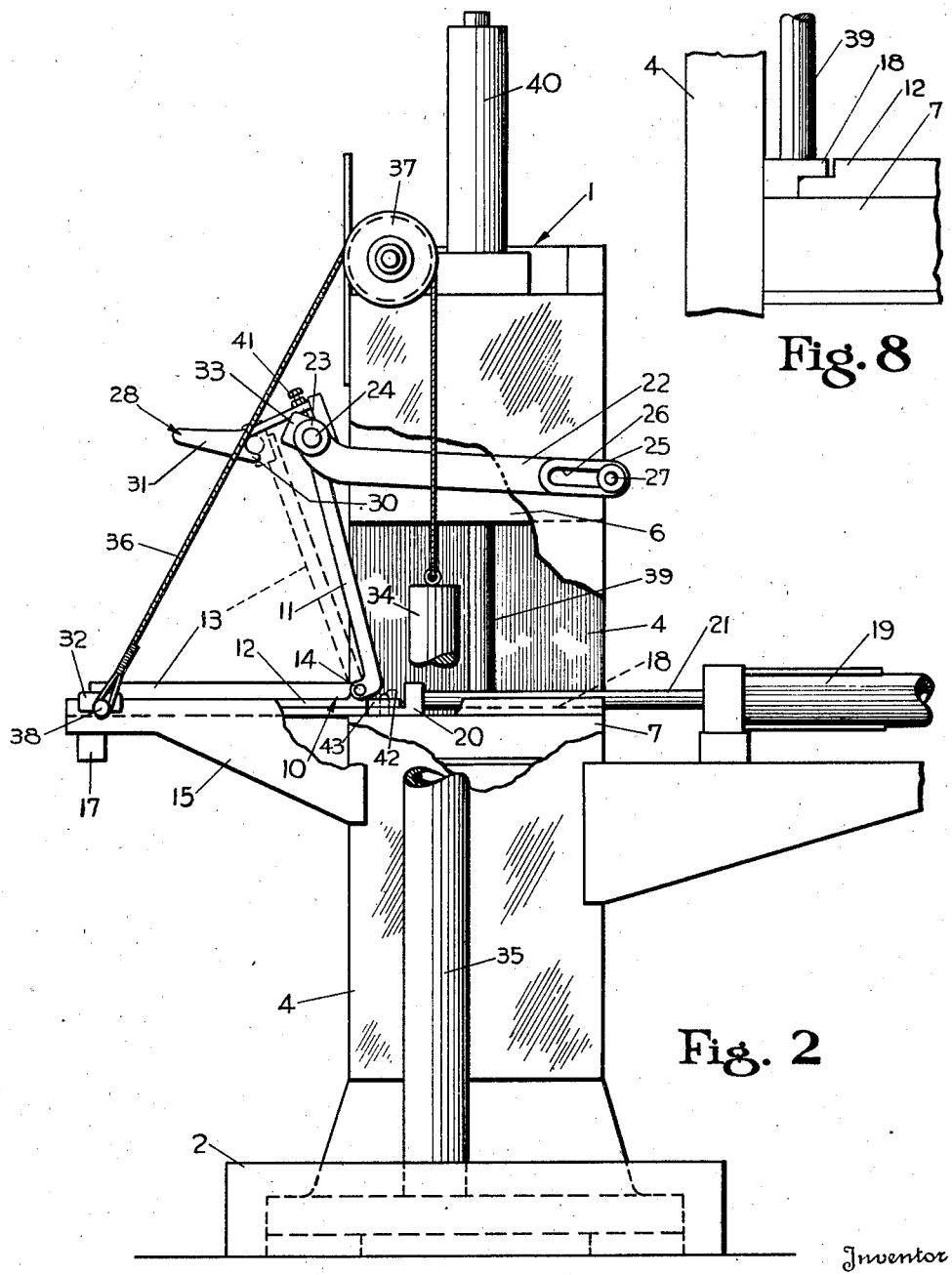

Nov. 18, 1947.                K. B. KILBORN                 2,431,048
                              MOLD PRESS
                         Filed Oct. 10, 1945              4 Sheets-Sheet 3
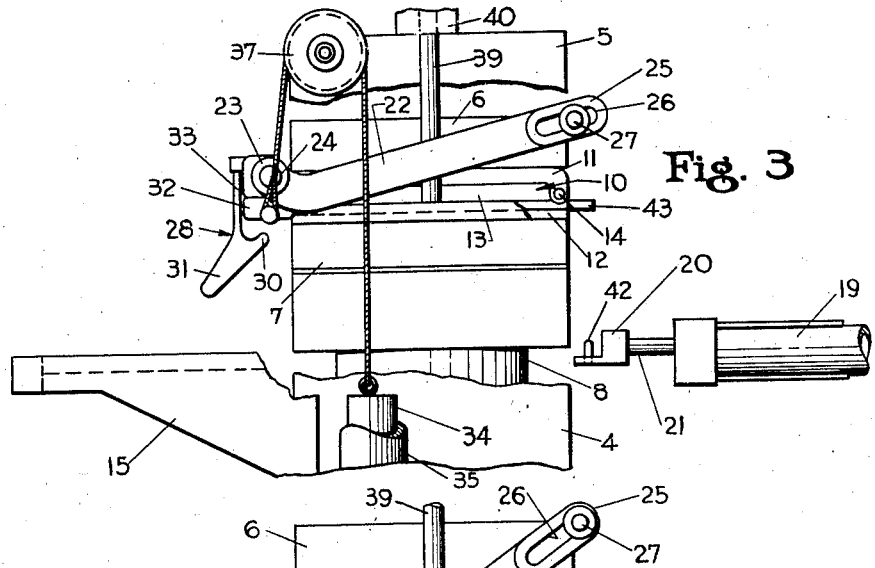
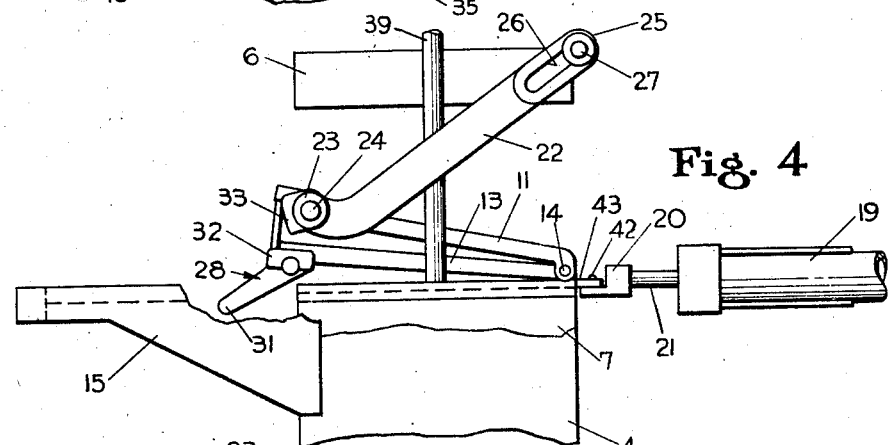
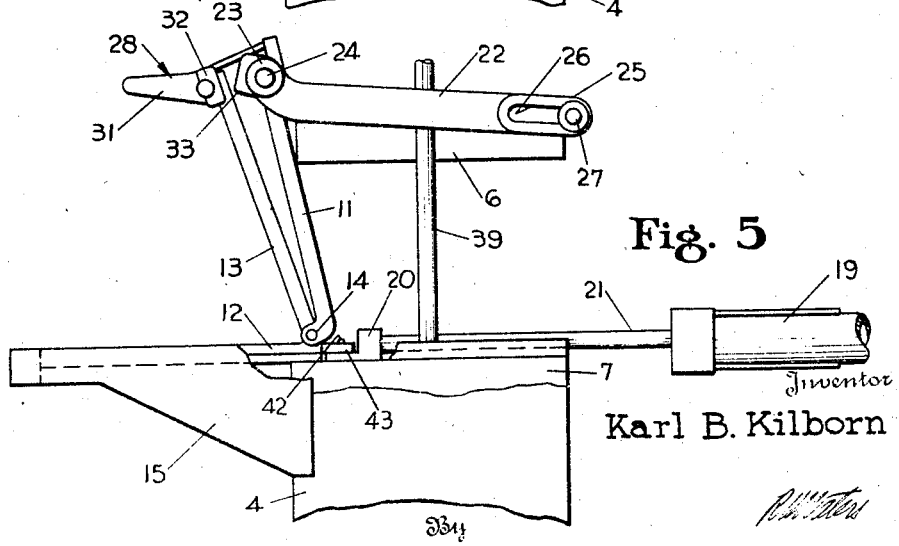
Inventor
Karl B. Kilborn Nov. 18, 1947.　　　K. B. KILBORN　　　2,431,048
MOLD PRESS
Filed Oct. 10, 1945　　　4 Sheets-Sheet 4

Inventor
Karl B. Kilborn
By
Attorney

Patented Nov. 18, 1947

2,431,048

UNITED STATES PATENT OFFICE 2,431,048

MOLD PRESS

Karl B. Kilborn, Akron, Ohio, assignor to Wingfoot Corporation, Akron, Ohio, a corporation of Delaware Application October 10, 1945, Serial No. 621,506

15 Claims. (Cl. 18—16)

The present invention relates to a mold press and improvements thereon. More particularly, the invention relates to novel form of mold press unit embodying a multi-part cavity mold and means for separating the parts of the mold while it is in position within the confines of the frame of the unit.

It is an object of the present invention to provide an improved form of mold press embodying a cavity mold made up of a plurality of sections or plates.

It is a further object of the invention to provide novel means coacting with the elements of the mold press to separate the parts of the cavity mold without damage or distortion of the molded products.

Another object of the invention is to provide means in a mold press for insuring the separation of the parts of a cavity mold in preparation for the loading and unloading of the several cavities formed in the mold.

A still further object of the present invention is to provide means for effecting the positive separation of the mold parts while the mold is disposed in its normal position in the press and before it is moved to a position externally thereof in which the molded goods are removed from the mold and new stock inserted in the cavities.

Existing conventional mold press units, for the most part, employ simple molds comprising top and bottom plates cooperating to define a number of cavities of a configuration corresponding to that of the finished molded articles. It is customary in such press units to cause the mold parts to be separated concomitantly with the removal of the mold from the press by a shifting means to a convenient position externally thereof for loading and unloading of the cavities. An example of such a conventional mold press unit is disclosed in Person Patent 1,984,697.

The application contemplates an apparatus which embodies all of the advantages of the conventional mold press unit in addition to a material reduction in maintenance cost and in the number and size of operative elements required for accomplishing the principles of the present invention. The prior art machines, for example, require a shifting means of a size sufficient not only to move the mold out from between the platens of the press unit but also to separate the leaves or plates of the mold in the same operation. This latter function requires the exertion of a force capable of overcoming the tendency of the molded material to hold the mold parts together.

One of the objectionable features of existing apparatus is the fact that the action of the shifting means is applied in a direction substantially normal to the direction of application of those forces resisting the motion of the mold and the separation of the parts thereof. In the improved apparatus of the present invention, means are provided to accomplish the separation of the mold parts by applying a force in direct opposition to those resistance forces which tend to prevent the separation of the parts. The means of the inventor operate independently of the shifting means.

The apparatus of the present invention also permits an increased mold capacity for the reason that it is capable of operating efficiently with a multi-part or multiple leaf mold embodying a greater number of cavities. This feature permits a greater production from the same labor and equipment outlay.

Other objects, features and advantages of the present invention will be apparent as the detailed description of one form of mold press applying applicant's inventive concept proceeds.

Figure 6:
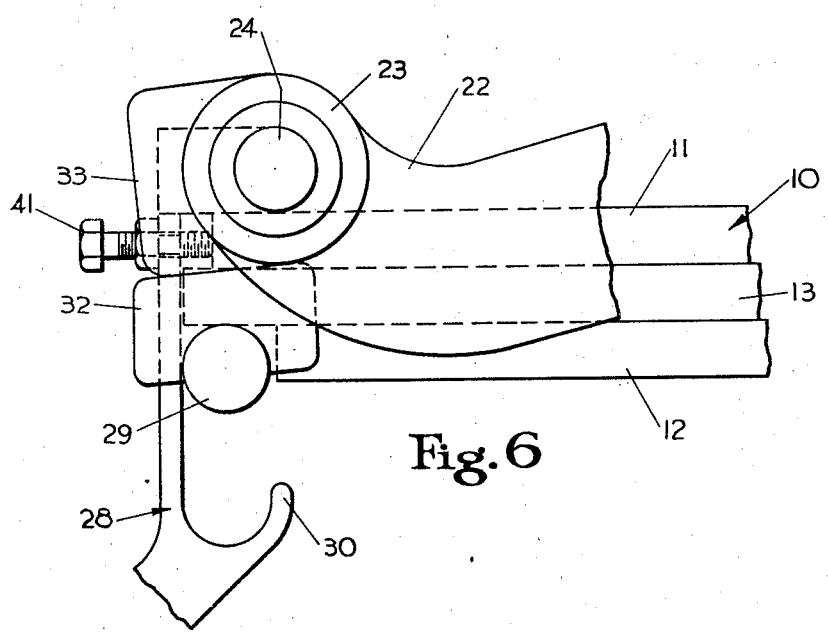
Figure 7:
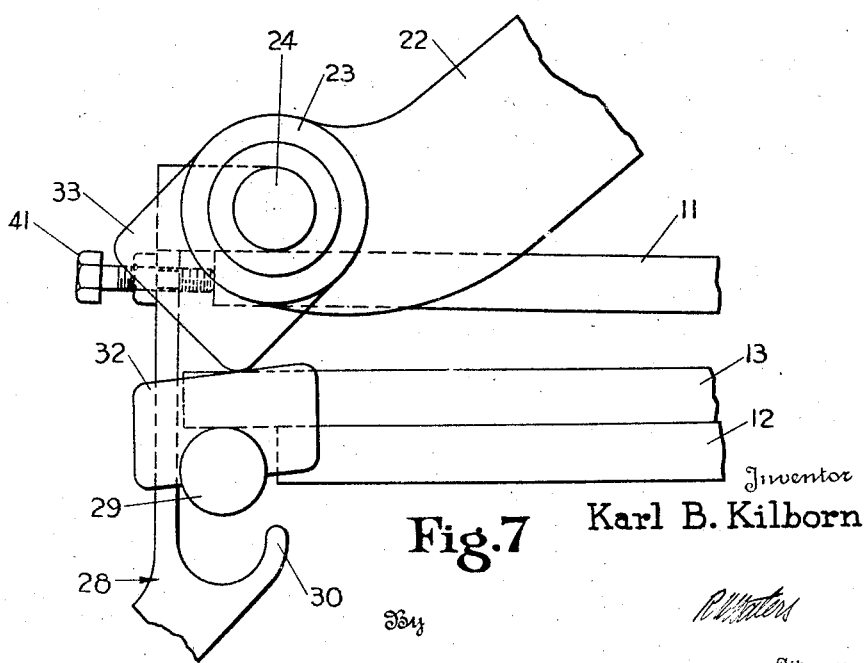

In the drawings illustrating a form of mold press with which the teachings of the present invention are particularly advantageously employed, Figure 1 represents a partial front elevation of a typical mold press unit. Figure 2 is an end elevation of the apparatus of Figure 1 with parts removed and broken away for clarification. Figures 3, 4 and 5 represent partial end views of the machine corresponding generally to Figure 2 and illustrating several operating positions of the unit. Figures 6 and 7 are fragmentary views at a somewhat larger scale illustrating the mold separating means of the invention and their method of operation. Figure 8 is a fragmentary view illustrating another of the operating elements incorporating the teachings of the invention.

In Figure 1 of the drawings, the reference numeral 1 identifies a mold press unit to which the teachings of the present invention may be particularly advantageously applied. The mold press 1 may, as indicated, be constructed in various arrangements such, for example, as in tandem or with a multiple number of units in side by side relationship. Thus, the mold press 1 illustrated in Figure 1 may be only a portion of the entire assembly, each portion, however, being a complete operating unit in and of itself.

The mold press 1 comprises a base 2 upon which is supported a hydraulic ram 3. A pair of frame members 4 are secured to and supported by the body of the ram 3 so as to carry a stationary head 5. Associated with and secured to the stationary head 5 is a fixed platen 6. A movable platen 7 is secured to the upper face of the piston 8 and is adapted to be actuated by the hydraulic ram 3 thereby coacting with the fixed platen 6 to provide heat and pressure as required to accomplish the vulcanizing operation performed by the mold press 1.

Suitable fluid conduits such, for example, as the piping 9, are connected to the hydraulic ram 3 for supplying fluid under pressure to the cylinder of the ram and for withdrawing fluid therefrom in the actuation of the piston 8. Any conventional control mechanism (not shown) may be employed in controlling the operation of the piston 8 for exerting the required pressure over the proper time interval to accomplish the vulcanization step. In addition, a piping system or suitable electrical elements (not shown) may be provided to furnish steam or other suitable heating media to the fixed platen 6 and the movable platen 7 in the operation of the mold press 1.

A multi-part cavity mold 10 embodying any desired number of leaves or plates such, for example, as a top plate 11, a bottom plate 12 and an intermediate plate 13 is adapted to be positioned between the fixed platen 6 and the movable platen 7 of the mold press 1. The mold 10 is advantageously of a type embodying a plurality of leaves or plates which afford a large number of cavities between the contiguous faces of the several plates defining the configurations of the articles which are to be molded. The several plates 11, 12 and 13 of the mold 10 are advantageously hinged together, as indicated by the reference character 14, thereby permitting the several parts to be separated or opened in a manner simulating the leaves of a book.

A pair of guides 15 in the form of brackets are secured to and extend outwardly substantially at right angles from the front face of the frame members 4. Each of the guides 15 supports a track 16 which, as will presently be seen, serves to provide a support for the mold 10 when it is shifted exteriorly of the mold press to enable the cavities therein to be loaded and unloaded. A guard 17 extending across the unsupported ends of the guides 15 serves to prevent the operator from coming into contact with the mold parts as they are moved to their extended positions along the track 16 and also affords a certain degree of rigidity to the guides.

The bottom plate 12 of the mold 10 is advantageously adapted to be engaged by an inwardly projecting flange portion 18 on the movable platen 7 when the mold is disposed within the confines of the press unit 1, in the manner indicated in Figure 8. The flange portions 18, as will be noted from Figure 8 of the drawings, serve to overlay the edges of the bottom plate 12 of the mold 10 in such fashion that, as the movable platen 7 is actuated, the bottom plate will be moved accordingly. The flange portions 18, although they engage the edges of the plate 12 as the piston 8 is actuated in a vertical direction, do not prevent its being moved in a horizontal plane at right angles to the vertical axis of the mold press 1 extending through the piston 8. The advantages of this arrangement will be apparent as the discussion of the apparatus proceeds.

The mold 10 is mounted in the mold press 1 for shiftable movement by a pneumatic cylinder 19 along the tracks 16 on the guides 15. Thus, the mold 10 is adapted to be shifted bodily from a position in which it is disposed between the fixed platen 6 and the movable platen 7 when the platens are separated to a position such as that illustrated in Figure 5 of the drawings in which the mold 10 is substantially completely supported by the guides 15. The pneumatic cylinder 19 which may advantageously be operated by air under pressure serves to cause the pin 42 on a head 20 mounted on the outermost end of the piston rod 21 to engage the aperture in a lip portion 43 on the back edge portion of the mold 10 adjacent the hinge 14 thereby providing for the lateral movement of the mold 10.

As will best be seen from Figures 1 and 2, a pair of link arms 22 are swingably mounted upon the frame members 4 of the mold press 1. One end of each of the link arms 22 is provided with a boss 23 pivotally mounted about the cylindrical portion 24 of a bar fixed to the front edge of the top plate 11 of the mold 10. The other end of each of the link arms 22 has a boss portion 25 in which is formed an elongated or slotted opening 26 engaging a pin 27 on the frame member 4. It will be understood that the slotted opening 26 provides a certain amount of lost motion in the operation of the link arms 22 as the mold 10 is raised and lowered by the action of the movable platen 7 actuated by the piston 8 of the hydraulic ram 3.

A disengageable supporting means or hook 28 is pivotally mounted upon the front edge of the top plate 11 of the mold 10. A pair of arcuately formed latching surfaces 29 is provided on the front edge of the intermediate plate 13 of the mold 10 substantially centrally thereof for registration with the prongs 30 of the hook 28 so that, upon the separation of the intermediate plate 13 from the top plate 11 of the mold 10, the former will be permitted only a restricted movement in a downward direction as the press is opened by the downward movement of the movable platen 7 and the piston 8. A handle portion 31 is provided on the hook 28 to facilitate disengagement of the prongs 30 from the latching surfaces 29 to permit the intermediate plate 13 to swing into a horizontal position for the purpose of loading and unloading the cavities formed between intermediate plate 13 and top plate 11.

A cam surface 32 is provided adjacent each of the lateral edges of the intermediate plate 13 for engagement with a cam portion 33 formed adjacent each of the boss portions 23 of the link arms 22. The cam surfaces 33 serve, upon rotation of the link arms 22 resulting from the movement of the piston 8 downwardly, to exert a force against the cam surfaces 32 on the intermediate plate 13 counteracting any tendency of the material being vulcanized in the cavities between the plates 13 and 11 to hold the plates together. This action causes the separation of plates 11 and 13 of the mold 10 as the movable platen 7 recedes therefrom upon descent of the piston 8.

The intermediate plate 13 is of such size and weight as to render it capable of disengagement from the prongs 30 of the hook 28 only by exertion of considerable effort on the part of the operator. A counterweight 34 is provided to reduce the effective weight of the intermediate plate 13 and to simplify the release and lowering of plate 13 on the part of the operator. The counterweight 34 is adapted to register with the open end of a vertical tube 35 mounted adjacent one of the frame members 4. A cable 36 passing over a pulley 37 rotatably mounted upon the stationary head 5 of the mold press 1 is secured to the outermost end of a handle portion 38 extending laterally from one of the edges of the intermediate plate 13.

A pair of pusher means or rods 39 is provided for separating the bottom plate 12 from the intermediate plate 13. These rods 39 extend vertically through the interior of the mold press 1 adjacent the inner walls of the frame members 4. The uppermost ends of pusher rods 39 are mounted in cylinders 40 extending above the stationary head 5 of the mold press 1. The bore of the cylinders 40 corresponds to the outer diameter of the upper ends of the rods 39, thus affording a pressure cylinder construction.

The cylinders 40 are adapted to be sealed off at the upper ends thereof and are filled with fluid under compression to create a constant force against the uppermost ends of the pusher rods 39. The lowermost ends of the rods 39 bear against and exert pressure upon the upper surface of flange portions 18 of the movable platen 7 overlaying the edges of bottom plate 12 of the mold 10, as more clearly indicated in Figure 8 of the drawings. The pressure exerted by the fluid in the cylinders 40 maintain the lowermost ends of the pusher rods in constant contact with the flange portions 18 throughout the entire operation of the mold press 1 in opposition to the action of the piston 8 of the hydraulic ram 3 which actuates the movable platen 7.

The inventive concept of the instant application will best be understood from a detailed description of the method of operation of the mold press 1. The operation of the press is begun with the plates 11, 12 and 13 of the mold 10 in the relative positions indicated in Figure 5 of the drawings. It will be noted that the movable platen 7 is in its lowermost position and that the bottom plate 12 of mold 10 is supported on the tracks 16 of the guides 15 in which position the mold cavities are accessible to the operator for removing the molded article and refilling with stock.

After the cavities in bottom plate 12 have been restocked, the operator grasps the handle portion 31 of hook 28 with one hand and the handle portion 38 extending outwardly from the intermediate plate 13 (shown as being supported in its uppermost position by the hook 28) thereby disengaging the prongs 30 from the latching surfaces 29. With this procedure, the plate 13 is lowered into contact with bottom plate 12 as will be seen in Figure 2. The weight of the plate 13 is counteracted by the counterweight 34 adjustably suspended over the pulley 37 and attached to the plate 13 by the cable 36. The hook 28 will be retained suspended outwardly by virtue of a set screw 41 adjusted to contact the front edge of upper plate 11.

Next, the cavities in the upper face of the intermediate plate 13 are reloaded with stock. After the mold 10 is fully loaded, the operator starts the apparatus by pressing a conventional start-stop switch (not shown) to reset the operating cycle of the machine. The pneumatic cylinder 19 is actuated to withdraw the piston rod 21 and head 20 thereby bringing the mold 10 back within the confines of the mold press 1 positioning it between the fixed platen 6 and the movable platen 7 in such fashion that the lateral edges of bottom plate 12 of the mold are slid into place beneath the flange portions 18 on the movable platen 7.

After the mold 10 is in molding position, or retracted but disposed between the platens of the mold press 1, the hydraulic ram 3 is automatically actuated the piston 8 thereof raising the movable platen 7 and the mold 10 carried thereby to bring the latter into contact with the fixed platen 6. In all of the manipulation of the mold 10, the pivotal mounting of the link arms 22 and the slotted opening 26 provide the required lost motion to enable the mold to be subjected to the heat and pressure of the platens 6 and 7 for completing the vulcanizing or molding operation of a predetermined fixed schedule controlled by a suitable conventional automatic cycling device (not shown).

Since the pressure exerted by the hydraulic ram 3 through piston 8 against the movable platen 7 greatly exceeds that exerted against the platen by the pusher rods 39, the platens will close and cause the rods to retract into their cylinders 40. This condition is temporary and continues only while the press platens are closed for the duration of the vulcanizing cycle.

The mold press 1 remains closed until the control unit again actuates the hydraulic ram 3 causing the piston 8 and movable platen 7 to descend carrying with it the mold 10 by virtue of the partially interleaved arrangement of the bottom plate 12 of the mold with the platen. As the platen 7 moves downward, the link arms 22 are pivoted about the cylindrical portions 24 and moved axially with respect to the pins 27. Each link arm 22 moves in an axial direction to the extent of the length of the slotted opening 26 therein until the pin 27 engages the extremity of the opening as will be seen in Figure 4.

While the link arms 22 are approaching their extended positions as the press 1 is opening, or while in the course of moving from the position shown in Figure 3 (press closed) to that in Figure 4 (press fully open), the bosses 23 at the lower ends of the arms rotate only a slight amount while the lost motion provided by the slotted opening 26 is taken up. However, when the link arms 22 reach the position shown in Figure 4 at the extremity of the slotted opening 26, the bosses 23 on the arms will rotate about the cylindrical portion 24. The cam portion 33 advantageously formed integrally with each of the boss portions 23 is thus rotated in contact with its cam surface 32.

This position of the cam portion 33 with respect to cam surface 32 during the axial movement of link arms 22 is clearly demonstrated in Figure 6. The action of the cam portion 33 upon the rotation of the boss 23 as the link arm 22 rotates about the pin 27 is shown in Figure 7. In this fashion, the intermediate plate 13 of mold 10 is forced apart or separated from the upper plate 11 leaving the plates free to open about their hinged mounting 14 without sticking when the mold is subsequently shifted bodily outside the press 1 by the operation of the pneumatic cylinder 19.

As the movable platen 7 now supporting the intermediate plate 13 and bottom plate 12 continues its descent, the prongs 30 of hook 28 engage the arcuate latching surfaces 29 on the frontal edge of the intermediate plate. The downward motion of the intermediate plate 13 is thus terminated while the bottom plate 12 secured to the movable platen 7 continues to descend therewith under the pressure exerted thereagainst by the pusher rods 39. The rods 39 constantly in contact with the flange portion 18 serve to insure that the platen 7 is urged to the lowermost extremity of its stroke in order that the bottom plate 12 will properly register with the track 16 on the guides 15 when the mold 10 is bodily moved out of the press 1.

Thus, by cooperation of the hook 28 with the pusher rods 39, the intermediate and bottom plates 13 and 12, respectively, will also be separated within the confines of the press 1 and while they are still positioned between the platens 6 and 7. Thereafter, as originally explained, the pneumatic cylinder 19 is actuated to move the mold 10 laterally to position the mold outside the press for loading and unloading the mold cavities. The pusher rods, since they contact only the flange portions 18 overhanging the edges of the bottom plate 12, do not interfere with the shifting of the plate laterally when the pneumatic cylinder 19 is operated.

After the mold 10 is removed from the press 1 in the fashion shown in Figure 5, and the cavities are unloaded and loaded again with fresh stock, the same operations are repeated.

It will be apparent that certain modifications may be made in the apparatus emploped in delineating the invention without in any way departing from the spirit or scope of the invention. A two part mold may readily be employed in the same general construction as that contemplated by the three part mold of the embodiment of the invention hereinbefore described. In such case, the intermediate plate and counterbalance could readily be omitted without affecting the teachings of the present invention.

While in accordance with the patent statutes one best known embodiment of the invention has been illustrated and described in detail, it is to be particularly understood that the invention is not limited thereto or thereby, but that the inventive scope is defined in the appended claims.

I claim:

1. In a mold press embodying a frame, a fixed platen and a movable platen mounted in the frame, a cavity mold having a bottom plate, a top plate and an intermediate plate, means for shifting the mold from a molding position between the platens to a position externally of the frame for loading and unloading the cavities, cam means for separating the intermediate plate from the top plate of the mold, and pusher means for separating the intermediate and bottom plates of the mold, said cam means and said pusher means cooperating to separate the several mold parts before the mold is moved from position between the platens in the frame by the shifting means.

2. In a mold press embodying a frame, a fixed platen and a movable platen mounted in said frame, a multiple part cavity mold in which the several parts are hingedly mounted with respect to each other to enable the mold to be loaded and unloaded, means for shifting the mold bodily from a molding position between the platens to a position externally of the frame, link means swingably mounted on the frame and pivotally connected to a part of the mold, cam means on said link means for separating certain of the mold parts, and pusher means for separating the remaining mold parts, said cam means and said pusher means cooperating to separate the several mold parts while the mold is retained between the platens.

3. In a mold press embodying a frame, a fixed platen and a movable platen mounted in said frame, and means for actuating the movable platen, a multi-part cavity mold in which the several parts are hingedly secured together to facilitate loading and unloading the cavities thereof, means for shifting the mold bodily from a molding position between the platens to one externally of the frame for the loading and unloading operations and thereafter reversing the procedure, cam means coacting with the actuating means for separating certain of the mold parts as the platens are moved apart, and pusher means similarly separating the remaining mold parts, said cam means and said pusher means operating to separate the several mold parts before the mold is moved by the shifting means.

4. In a mold press embodying a frame, a fixed platen and a movable platen mounted in said frame, and means for actuating the movable platen, a cavity mold having at least three separable parts in which the several parts are hingedly secured together to facilitate loading and unloading the cavities thereof, means for shifting the mold bodily from a molding position between the platens to one externally of the frame for the loading and unloading operations and thereafter reversing the procedure, means interconnecting the frame and one of the separable parts of the mold, means on said interconnecting means coacting with the means actuating the movable platen for separating certain of the mold parts as the platens move apart, and means for opening the remaining mold parts, both said separating and opening means cooperating to part the several mold parts while the mold proper is disposed between the platens and before it is moved therefrom by the shifting means.

5. In a mold press embodying a frame, a fixed platen and a movable platen mounted in said frame, and means for actuating the movable platen, a multi-part cavity mold in which the several parts are hingedly secured together to facilitate loading and unloading the cavities thereof, means for shifting the mold bodily from a molding position between the platens to one externally of the frame for the loading and unloading operations and thereafter reversing the procedure, link means swingably mounted on the frame and pivotally connected to a part of the mold, cam means on the link means for separating certain of the mold parts as the platens are moved apart, and pusher means for similarly separating the remaining mold parts, said cam means and said pusher means operating contemporaneously while the mold proper is disposed between the platens and before it is moved therefrom by the shifting means.

6. In a mold press embodying a frame, a fixed platen and a movable platen mounted in said frame, and means for actuating the movable platen, a multi-part cavity mold in which the several parts are hingedly secured together to facilitate loading and unloading the cavities thereof, means for shifting the mold bodily from a molding position between the platens to one externally of the frame for the loading and unloading operations and thereafter reversing the procedure, link means swingably mounted on the frame and pivotally connected to a part of the mold, cam means on the link means for separating certain of the mold parts as the platens are moved apart, and pusher means acting in opposition to the action of the actuating means operating to close the platens for separating the remaining mold parts as the actuating means is operated to open the platens, said cam means and said pusher means operating contemporaneously while the mold proper is disposed between the platens and before it is moved therefrom by the shifting means.

7. In a mold press embodying a frame, a fixed platen and a movable platen mounted in said frame, and means for actuating the movable platen, a multi-part cavity mold having a bottom plate, a top plate and an intermediate plate hingedly mounted with respect to each other to facilitate loading and unloading of the cavities therein, means for shifting the mold bodily from a molding position between the platens to one externally of the frame for the loading and unloading operation and thereafter reversing the procedure, cam means coacting with the actuating means for separating the top and intermediate plates of the mold as the platens are moved apart, and pusher means similarly separating the intermediate and bottom plates of the mold, said cam means and said pusher means operating to separate the several mold parts before the mold is moved away from the molding position by the shifting means.

8. In a mold press embodying a frame, a fixed platen and a movable platen mounted in the frame, a cavity mold having a bottom plate, a top plate and an intermediate plate, means for shifting the mold from a molding position between the platens to a position externally of the frame for loading and unloading the cavities, cam means for separating the intermediate plate from the top plate of the mold, pusher means for separating the intermediate and bottom plates of the mold, said cam means and said pusher means cooperating to separate the several mold parts before the mold is moved from molding position in the frame by the shifting means, and means for temporarily supporting the intermediate plate in spaced relation to the top and bottom plates of the mold after the cam means and the pusher means have separated them.

9. In a mold press embodying a frame, a fixed platen and a movable platen mounted in said frame, a multiple part cavity mold in which the several parts are hingedly mounted with respect to each other to enable the mold to be loaded and unloaded, means for shifting the mold bodily from a molding position between the platens to a position externally of the frame, link means swingably mounted on the frame and pivotally connected to a part of the mold, cam means on said link means for separating certain of the mold parts, pusher means for separating the remaining mold parts, said cam means and said pusher means cooperating to separate the several mold parts while the mold is retained in molding position, and means for temporarily supporting the several parts of the mold in opened relation to each other after the parts have been separated and before being shifted externally of the frame.

10. In a mold press embodying a frame, a fixed platen and a movable platen mounted in said frame, and means for actuating the movable platen, a multi-part cavity mold in which the several parts are hingedly secured together to facilitate loading and unloading the cavities thereof, means for shifting the mold bodily from a molding position between the platens to one externally of the frame for the loading and unloading operations and thereafter reversing the procedure, cam means coacting with the actuating means for separating certain of the mold parts as the platens are moved apart, pusher means similarly separating the remaining mold parts, said cam means and said pusher means operating to separate the several mold parts before the mold is moved by the shifting means, and means for temporarily supporting certain of the mold parts in spaced relation after the cam and pusher means have completed the separation thereof.

11. In a mold press embodying a frame, a fixed platen and a movable platen mounted in said frame, and means for actuating the movable platen, a multi-part cavity mold in which the several parts are hingedly secured together to facilitate loading and unloading the cavities thereof, means for shifting the mold bodily from a molding position between the platens to one externally of the frame for the loading and unloading operations and thereafter reversing the procedure, link means swingably mounted on the frame and pivotally connected to a part of the mold, cam means on the link means for separating certain of the mold parts as the platens are moved apart, pusher means acting in opposition to the action of the actuating means operating to close the platens for separating the remaining mold parts as the actuating means is operated to open the platens, said cam means and said pusher means operating contemporaneously to separate the several mold parts while the mold proper is disposed between the platens and before it is moved therefrom by the shifting means, and means for temporarily supporting certain of the mold parts in spaced relation after the cam and pusher means have completed the separation thereof.

12. In a mold press embodying a frame, a fixed platen and a movable platen mounted in said frame, and means for actuating the movable platen, a multi-part cavity mold having a bottom plate, a top plate and an intermediate plate hingedly mounted with respect to each other to facilitate loading and unloading of the cavities therein, means for shifting the mold bodily from a molding position between the platens to one externally of the frame for the loading and unloading operation and thereafter reversing the procedure, cam means coacting with the actuating means for separating the top and intermediate plates of the mold as the platens are moved apart, disengageable supporting means on said top plate for engaging the intermediate plate as the movable platen is actuated to open the press, means on said movable platen for slidably engaging the bottom plate of the mold, and pusher means acting against the movable platen to urge said platen with the bottom mold plate mounted therein toward its extreme open position in cooperation with the supporting means to separate the intermediate plate from the bottom plate, said supporting means acting temporarily to support the intermediate plate in spaced relation to the top and bottom plates after the plates are separated.

13. In a mold press embodying a frame, a fixed platen and a movable platen mounted in said frame, and means for actuating the movable platen, a multi-part cavity mold in which the several parts are hingedly secured together to facilitate loading and unloading the cavities thereof, means for shifting the mold bodily from a molding position between the platens to one externally of the frame for the loading and unloading operations and thereafter reversing the procedure, link means swingably mounted on the frame and pivotally connected to a part of the mold, cam means on the link means for parting certain of the mold parts as the platens are moved apart, supporting means swingably mounted on said top plate for latching engagement with the intermediate plate as the movable platen is actuated to open the press, means on said movable platen for securing the bottom plate of the mold thereon in slidable relation thereto, and pusher means constantly opposing the movable platen and urging the same and the bottom plate of the mold secured thereto toward its extreme open position, said pusher means acting to force the bottom plate away from the intermediate plate temporarily supported by the supporting means after which said supporting means temporarily retains the intermediate plate in spaced relation to the top and bottom plates after they have been separated.

14. In a mold press, a cavity mold having a top, a bottom, and an intermediate part all of which are hingedly connected together, a cavity in the uppermost face of each of the two last-mentioned parts, means exerting pressure upon the closed mold when in position in the press for the molding operation, and means for separating each of the several mold parts from its cooperating part upon the release of the pressure exerting means and while the mold is still disposed wholly within the press and between the pressure exerting means.

15. In a mold press embodying a frame, a fixed platen, and a movable platen mounted in the frame, a cavity mold having a top plate, a bottom plate, and an intermediate plate all of which are hingedly connected together, means for shifting the mold bodily from a molding position between the platens to a position externally of the frame for loading and unloading the cavities, means on the movable platen for slidably holding the bottom plate of the mold, means for separating the intermediate plate and the top plate of the mold, and means urging the movable platen downwardly as the press is opened for separating the bottom plate from the intermediate plate of the mold, both said separating means and said urging means coacting to separate the several mold parts while the mold is in position between the platens and before it is moved externally of the frame by the shifting means.

KARL B. KILBORN.

REFERENCES CITED

The following references are of record in the file of this patent:

UNITED STATES PATENTS

| Number | Name | Date |
|---|---|---|
| 903,840 | Carter | Nov. 17, 1908 |
| 1,971,850 | Ernst | Aug. 28, 1934 |
| 2,013,320 | Shank et al. | Sept. 3, 1935 |
| 1,399,843 | Bowden | Dec. 13, 1921 |
| 2,331,015 | Dawes et al. | Oct. 5, 1943 |
| 2,386,641 | Trockle et al. | Oct. 9, 1945 |
| 2,160,805 | Winegar | June 6, 1939 |
| 2,354,447 | Allen | July 25, 1944 |
| 2,404,631 | Gronemeyer | July 23, 1946 |